United States Patent [19]

Martinson

[11] Patent Number: 4,998,698

[45] Date of Patent: Mar. 12, 1991

[54] GLUE GUN HOLDER APPARATUS

[76] Inventor: Jon P. Martinson, 2034 Peoria Pl., Oxnard, Calif. 93033

[21] Appl. No.: 459,248

[22] Filed: Dec. 29, 1989

[51] Int. Cl.[5] ............................................ F16M 11/00

[52] U.S. Cl. .................................. 248/176; 211/60.1; 211/70.6; 219/242; 248/117.2

[58] Field of Search .................. 248/117.1, 117.2, 314, 248/176; 211/64, 70.6, 60.1; 222/148, 186; 219/242

[56] References Cited

U.S. PATENT DOCUMENTS

| | | | |
|---|---|---|---|
| 3,705,680 | 12/1972 | Siegel | 219/242 X |
| 4,176,778 | 12/1979 | Fortune | 219/242 X |
| 4,333,623 | 6/1982 | May | 248/176 |
| 4,456,816 | 6/1984 | Fortune | 219/242 |
| 4,692,587 | 9/1987 | Spirk, Jr. et al. | 222/173 X |
| 4,762,979 | 8/1988 | Geoffroi | 248/117.1 X |
| 4,826,049 | 5/1989 | Speer | 248/117.2 X |

*Primary Examiner*—David L. Talbott

*Attorney, Agent, or Firm*—Leon Gilden

[57] ABSTRACT

An apparatus is set forth including a planar base mounting a receptacle container orthogonally mounted to a top surface of the base, including sloped interior walls positioned aligned with and rearwardly of spaced left and right legs, wherein a rearwardly directed support wall is positioned and fixedly mounted between the legs for support of a glue gun member thereon. A support boss is positioned forwardly and adjacent the wall at a lowermost end thereof and mounted to the base between the legs for positioning of a clip leg of the glue gun thereon to stabilize the glue gun in a rest position upon the apparatus. A ceramic tile member to accommodate glue dripped thereon is positioned forwardly of the boss. A glue stick magazine is provided adjacent the ceramic plate. Optionally, glue gun tip cleaners are provided formed with conically ribbed interior surfaces provided with replaceable inserts to enhance their cleaning and maintenance.

2 Claims, 5 Drawing Sheets

Fig 1
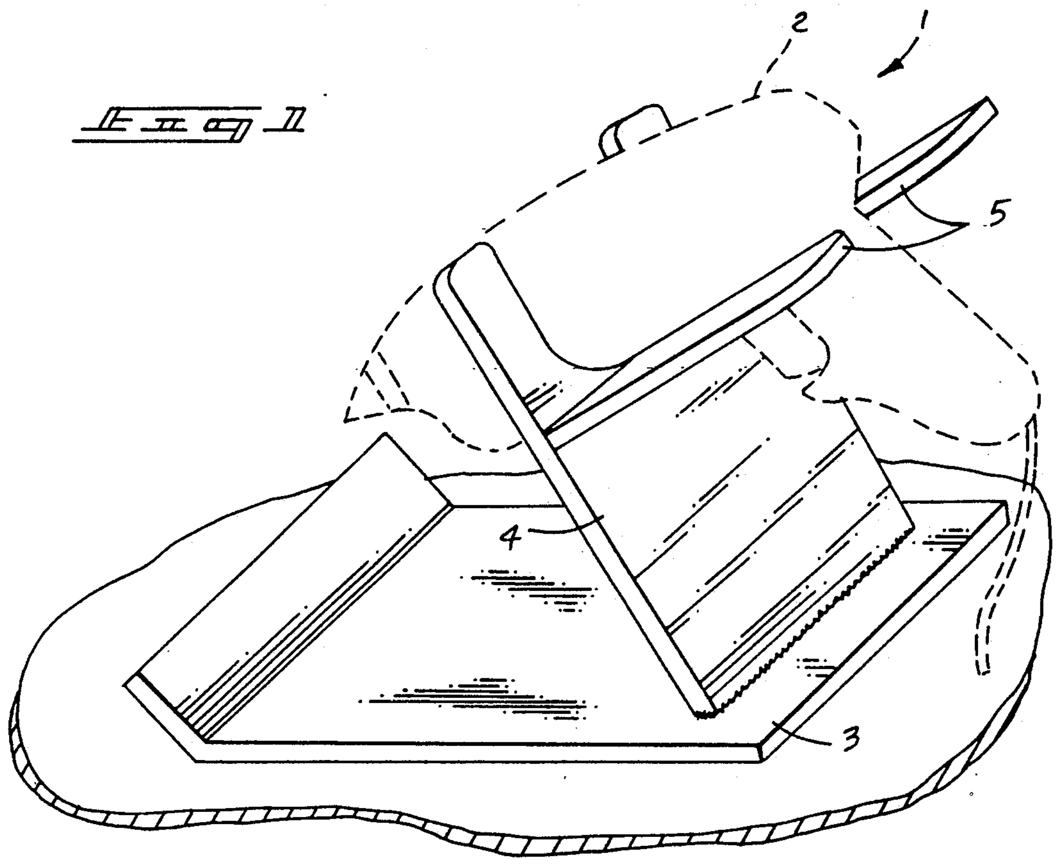
PRIOR ART
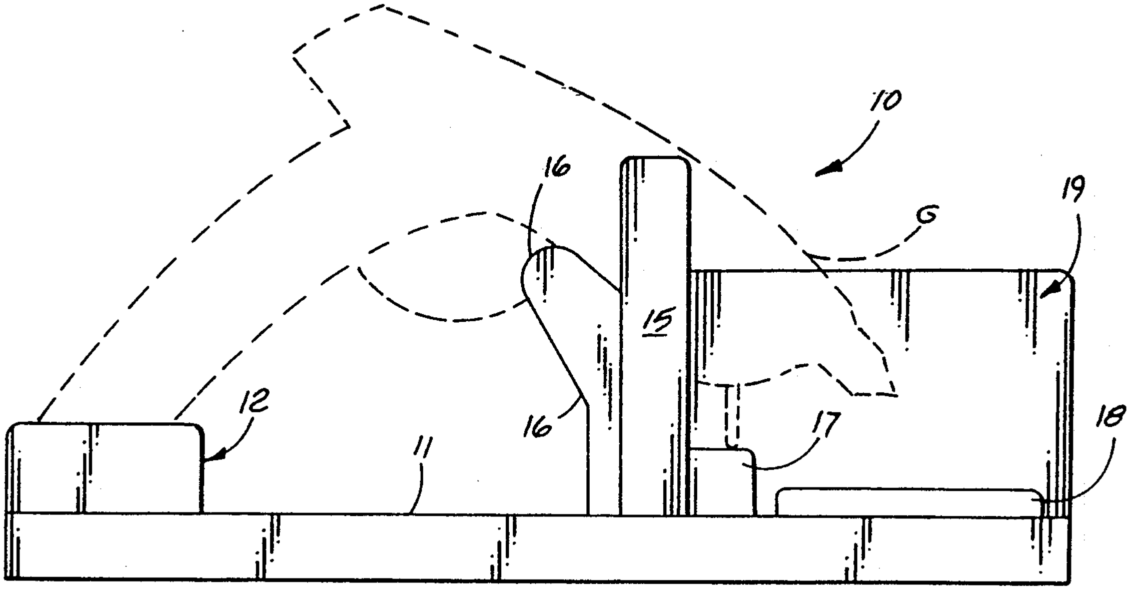
Fig 2

GLUE GUN HOLDER APPARATUS

BACKGROUND OF THE INVENTION

1. Field of the Invention

The field of invention relates to glue gun accessory devices, and more particularly pertains to a new and improved glue gun holder apparatus wherein the same selectively mounts a glue gun during periods of non-use.

2. Description of the Prior Art

Typically in the use of a gluing procedure utilizing contemporary glue gun construction, the glue gun continues to direct the heated glue forwardly of the tip for an extended period of time subsequent to its use. Such glue, at its elevated temperature, provides unpleasant, if not dangerous, consequences to an individual and surrounding environment. The instant apparatus attempts to overcome deficiencies of the prior art by providing a support which enables the glue thusly directed forwardly of the tip subsequent to use to be directed and deposited upon an easily maintained ceramic plate. Examples of the prior art include U.S. Pat. No. 4,333,623 to May sets forth a holder mounted between bifurcated legs of a support bracket to position the glue gun. The device fails to provide the easily cleansed ceramic surface utilized by the instant invention, as well as the associated socket connected with the arcuate wall to properly maintain the gun and prevent inadvertent dropping or mispositioning of the gun during securement to the instant invention.

U.S. Pat. No. 4,673,148 to Oliver sets forth a hair dryer holder wherein a wall-mounted bracket includes a cylindrical socket with a securement tab to secure the gun configured hair dryer when not in use.

U.S. Pat. No. 4,215,838 to Gullota sets forth a musical instrument support stand wherein a support bracket includes an angulated rod with a plurality of upwardly extending pairs of legs for support of a musical instrument thereon.

U.S. Pat. No. 4,730,799 to Foss, et al., sets forth a glue gun organizer including a metal base to enable glue to drip thereon, with an upwardly extending storage member for support of glue sticks, wherein the organization, as in other prior art, fails to provide a multi-point support for the glue gun as set forth by the instant invention to prevent inadvertent spillage and removal thereon, as well as not providing the tip cleaning member as utilized by the instant invention to enhance maintenance of the glue gun.

U.S. Pat. No. 4,446,972 to Sussman sets forth a support rack, wherein a plurality of hair drying accessories are directed through openings formed within an upper planar support for reception within recesses formed within a lower planar support.

As such, it may be appreciated that there is a continuing need for a new and improved glue gun holder apparatus as set forth by the instant invention wherein the same addresses both the problems of ease of use and effectiveness in the orientation and positioning of a glue gun during periods of non-use and in this respect, the present invention substantially fulfills this need.

SUMMARY OF THE INVENTION

In view of the foregoing disadvantages inherent in the known types of glue gun holder organizations now present in the prior art, the present invention provides a glue gun holder apparatus wherein the same selectively and securely positions a glue gun during periods of non-use in a multi-point support apparatus. As such, the general purpose of the present invention, which will be described subsequently in greater detail, is to provide a new and improved glue gun holder apparatus which has all the advantages of the prior art glue holder devices and none of the disadvantages.

To attain this, the present invention includes an apparatus including a planar base mounting a receptacle container orthogonally mounted to a top surface of the base, including sloped interior walls positioned aligned with and rearwardly of spaced left and right legs, wherein a rearwardly directed support wall is positioned and fixedly mounted between the legs for support of a glue gun member thereon. A support boss is positioned forwardly and adjacent the wall at a lowermost end thereof and mounted to the base between the legs for positioning of a clip leg of the glue gun thereon to stabilize the glue gun in a rest position upon the apparatus. A ceramic tile member to accommodate glue dripped thereon is positioned forwardly of the boss. A glue stick magazine is provided adjacent the ceramic plate. Optionally, glue gun tip cleaners are provided formed with conically ribbed interior surfaces provided with replaceable inserts to enhance their cleaning and maintenance.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and i order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved glue gun holder apparatus which has all the advantages of the prior art glue gun holder devices and none of the disadvantages.

It is another object of the present invention to provide a new and improved glue gun holder apparatus which may be easily and efficiently manufactured and marketed.

It is a further object of the present invention to provide a new and improved glue gun holder apparatus which is of a durable and reliable construction.

An even further object of the present invention is to provide a new and improved glue gun holder apparatus which is susceptible of a low cost of manufacture with regard to both materials and labor, and which accordingly is then susceptible of low prices of sale to the consuming public, thereby making such glue gun holder apparatus economically available to the buying public.

Still yet another object of the present invention is to provide a new and improved glue gun holder apparatus which provides in the apparatuses and methods of the prior art some of the advantages thereof, while simultaneously overcoming some of the disadvantages normally associated therewith.

Still another object of the present invention is to provide a new and improved glue gun holder apparatus wherein the same provides a support arrangement for a multi-point positioning and securement of a glue gun to maintain its orientation, with a readily cleansed ceramic plate to enable enhanced cleansing thereof during drippage of excess glue thereon, as well as providing maintenance cleansing recesses for selective cleansing of the glue un tip.

These together with other objects of the invention, along with the various features of novelty which characterize the invention, are pointed out with particularity in the claims annexed to and forming a part of the disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a typical prior art glue gun support structure. FIG. 2 is an orthographic side view taken in elevation of the instant invention.

DESCRIPTION OF THE PREFERRED EMBODIMENT

Figure 3:
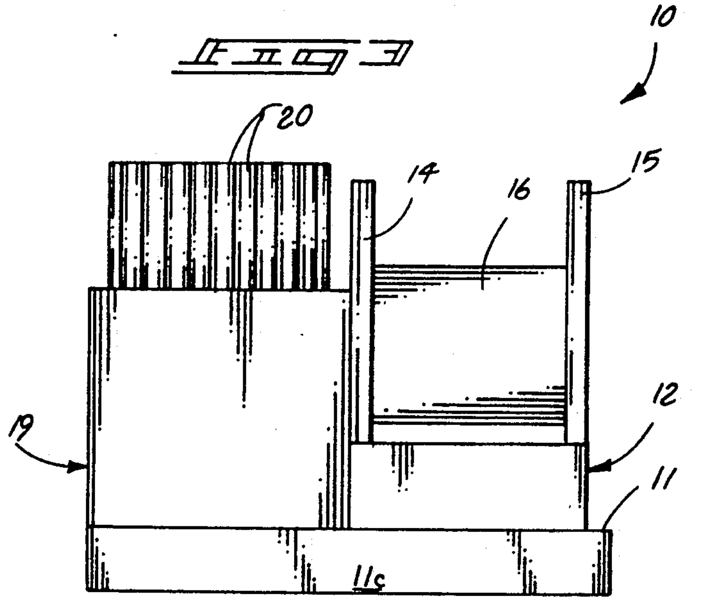
FIG. 3 is an orthographic rear view taken in elevation of the instant invention.
Figure 4:
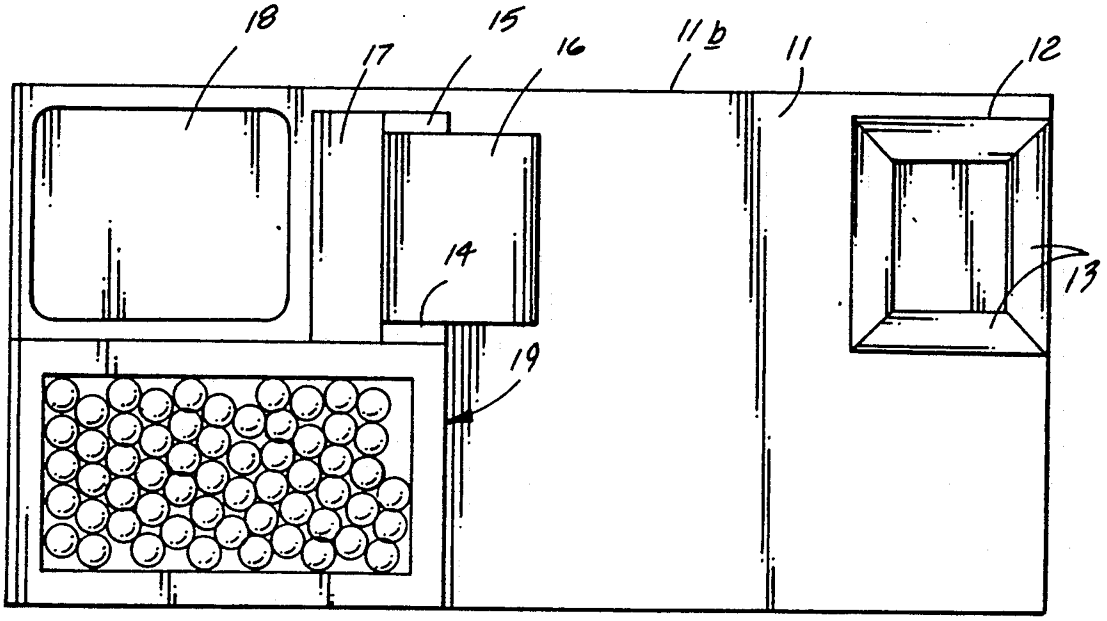
FIG. 4 is an orthographic top view of the instant invention.
Figure 5:
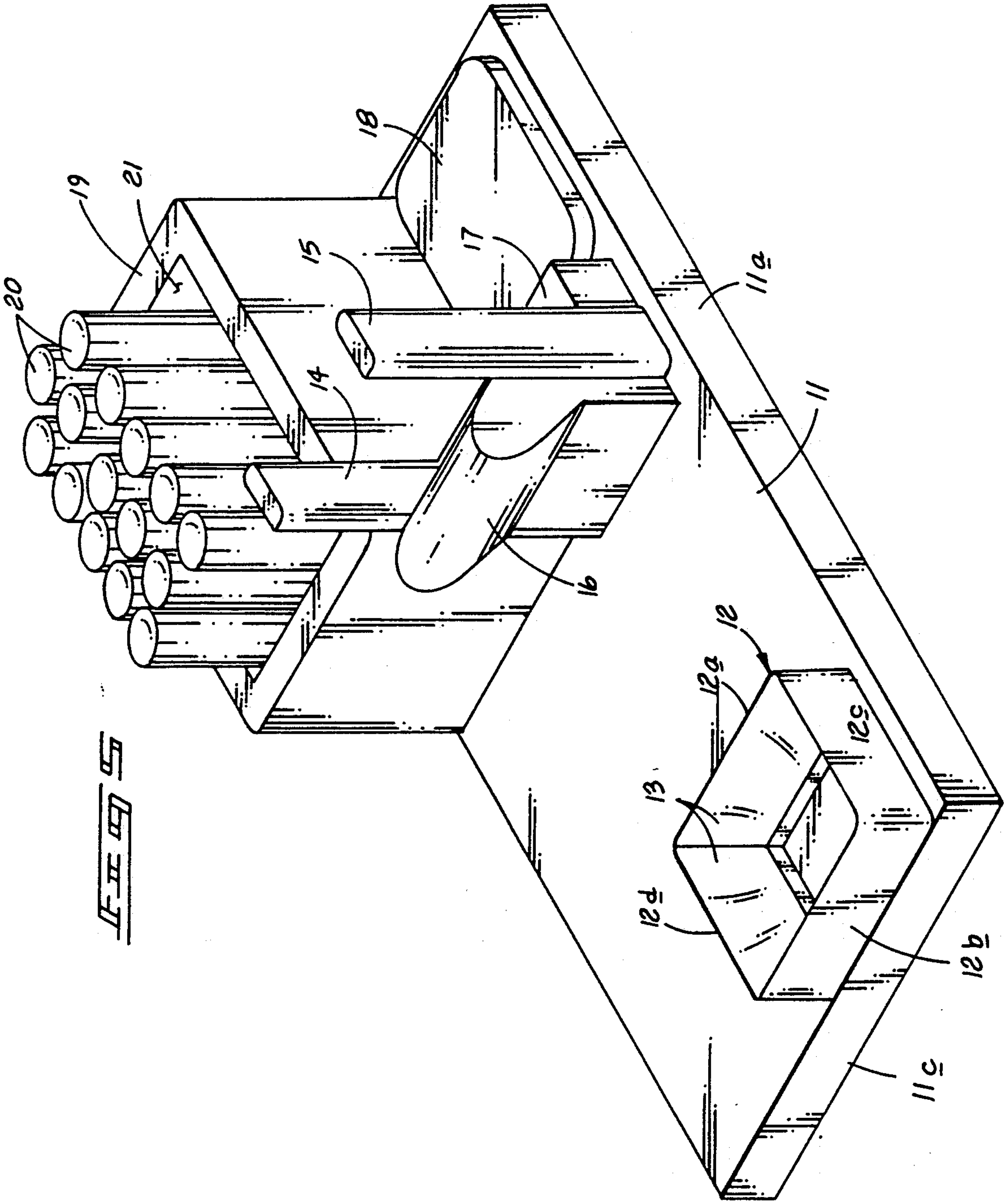
FIG. 5 is an isometric illustration of the instant invention.

With reference now to the drawings, and in particular to FIGS. 1 to 10 thereof, a new and improved glue gun holder apparatus embodying the principles and concepts of the present invention and generally designated by the reference numerals 10 and 10*a* will be described.

FIG. 1 is illustrative of a typical prior art glue gun support device wherein the prior art device 1 mounts a glue gun 2 thereon. The device includes a relatively elongate base member 3 formed with an acutely mounted bracket 4 secured to the base formed with bifurcated legs to receive the gun and mount the same to the bracket.

Figure 6:
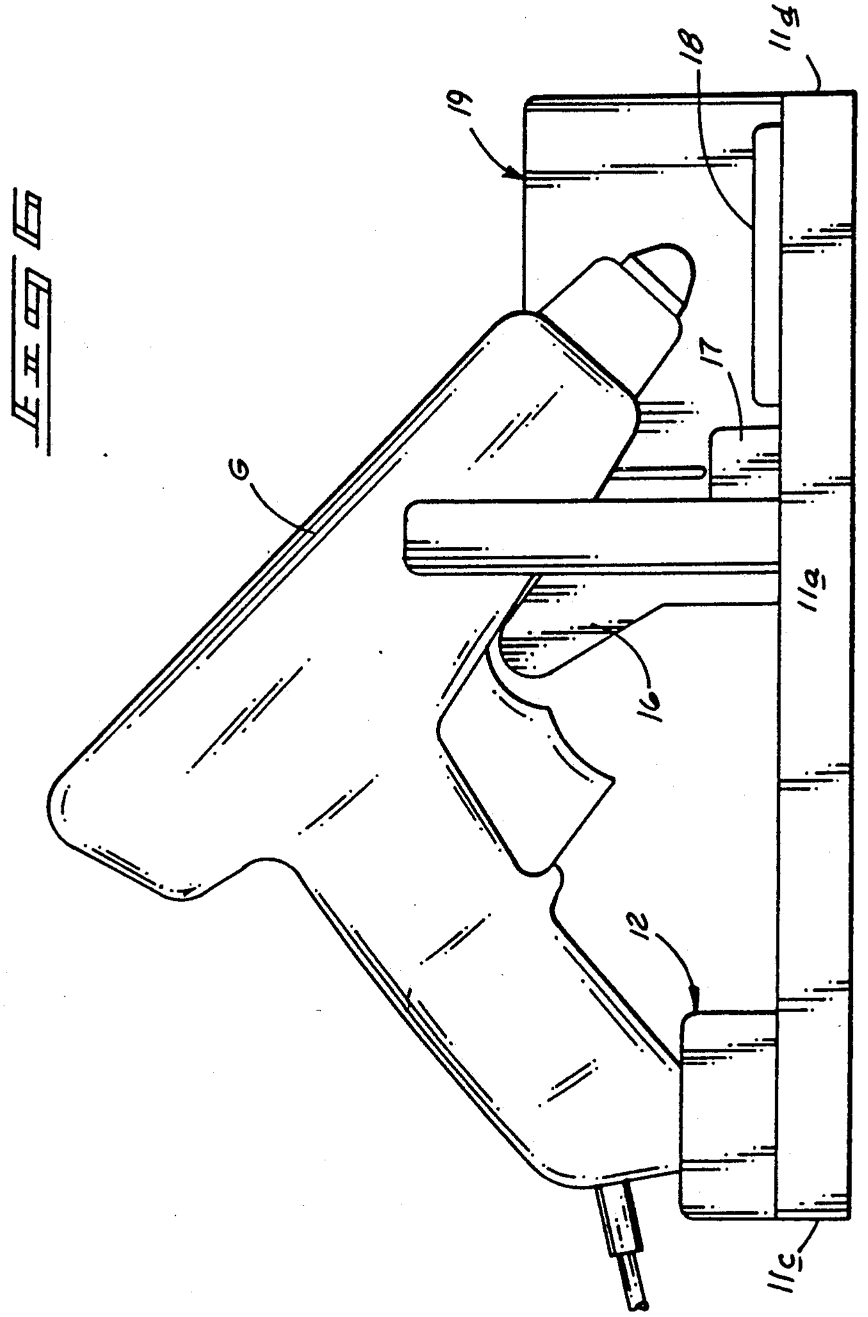
FIG. 6 is an orthographic side view of the instant invention taken in elevation mounting an associated glue gun thereon.

More specifically, the glue gun holder apparatus 10 essentially comprises a planar base member 11 defined by a right side 11*a*, a left side 11*b*, a rear side 11*c*, and a forward side 11*d*. A registration container 12 defined by four upstanding walls mounted orthogonally to the top surface of the planar base each include interior sloping surfaces 13 directed downwardly from their top edges to the bottom of the base to define a cavity tapering downwardly to receive a handle portion of an associated glue gun thereon. The walls of the registration container are defined by a forward wall 12*a*, a rear wall 12*b*, a right side wall 12*c*, and a left side wall 12*d*. The registration container 12 is mounted adjacent the rear side wall 11*c* of the base and the right side wall 11*a* and is positioned rearwardly of a generally "L" shaped rearwardly sloping support wall 16. The support wall 16 is defined by a forward arcuate end 16*a* to be received within the intersection of the main body and handle of the associated glue gun "G", and prevent unneccessary marring or defacing of the glue gun during its positioning upon the apparatus. The support wall 16 is positioned between parallel legs defined by a left leg 14 and a right leg 15. The left and right legs extend upwardly above the "L" shaped support wall 16, which in turn extends above the registration container 12 to position the glue gun in a downwardly oriented configuration, as illustrated in FIGS. 2 and 6 for example, to direct a forward tip of the glue gun to overlie a ceramic plate 18. The ceramic plate 18 is of a generally smooth surface to enable cleaning and maintenance of the ceramic plate upon deposit of glue directed thereon from the tip subsequent to use of the glue gun. A clip mount block 17 is positioned between the ceramic plate 18 and the support wall 16 to receive the clip pivotally mounted in a typical manner to a forward portion of the body of the glue gun, as illustrated in FIG. 6 for example, to ensure the downward orientation of the nozzle of the glue gun and prevent unnecessary build up of glue directed from the tip from adhering to the tip during periods of non-use. A glue stick magazine 19 is positioned adjacent the ceramic plate 18 to receive a quantity of glue sticks 20 therewithin for use by the glue gun "G". The magazine 19 defines a magazine cavity 21 of a generally rectangular parallelepiped configuration to receive and maintain the glue sticks in a vertical orientation preventing their deformation during storage.

Figure 7:
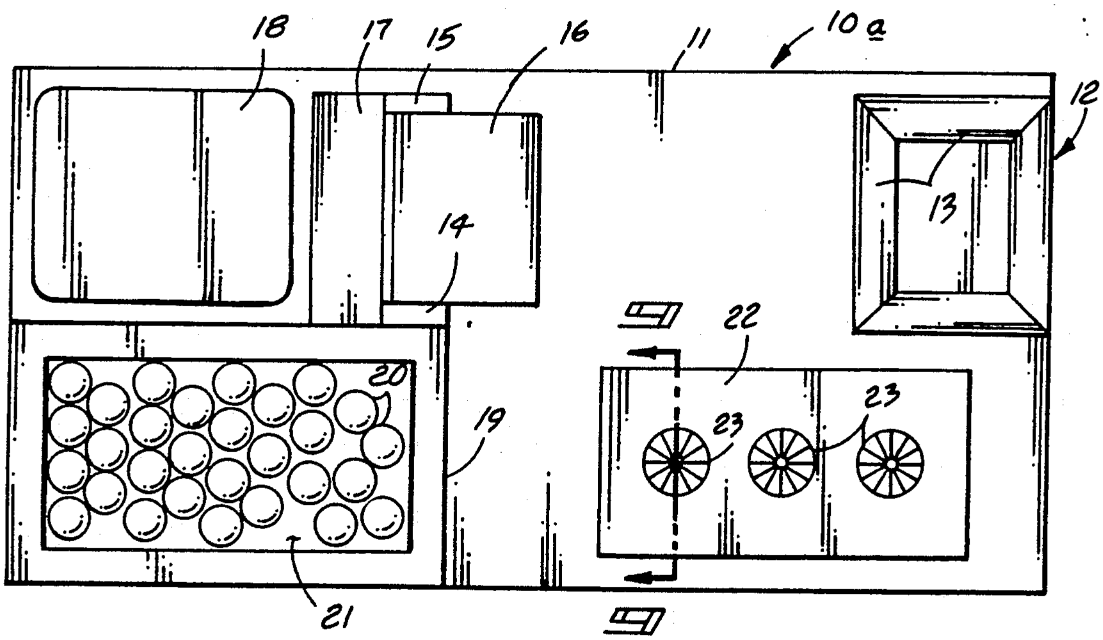
FIG. 7 is an orthographic top view of a modification of the instant invention.
Figure 8:
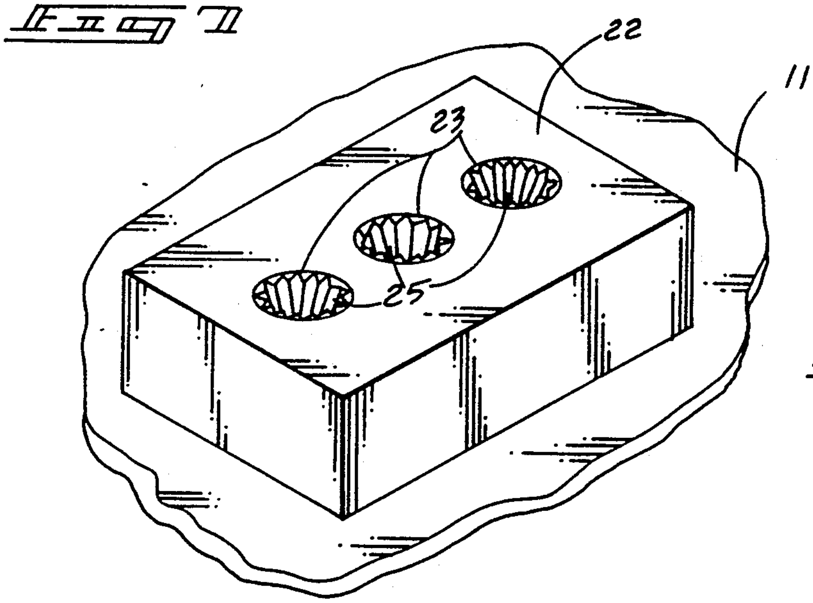
FIG. 8 is an isometric illustration of the tip cleaning assembly utilized by the instant invention.
Figure 9:
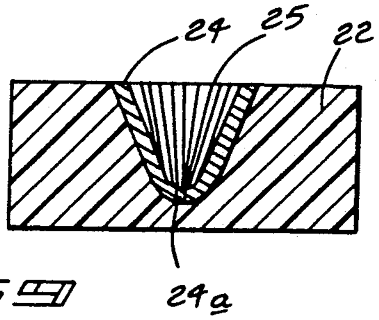
FIG. 9 is an orthographic view taken along the lines 9—9 of FIG. 7 in the direction indicated by the arrows.
Figure 10:
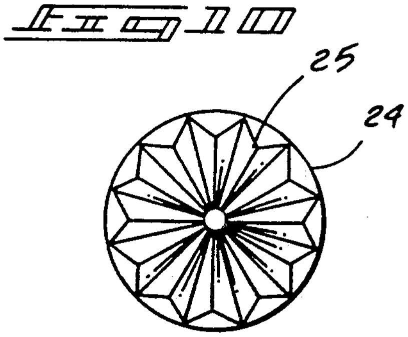
FIG. 10 is a top orthographic view of a tip cleaning insert utilized by the instant invention.

FIG. 7 illustrates a modified apparatus 10, wherein a tip cleaning block 22 is positioned rearwardly of the magazine 19. The tip cleaning block 22 is provided to afford an individual the capacity to clean excessive glue deposited from about the forward tip of a conventional glue gun. The tip cleaning block 22 is formed of a plurality of conical recesses 23 formed with conically ribbed interior surfaces 25. FIG. 9 illustrates the conical recesses 23 defined by a removable conical metal insert 24 that is removed and formed with a forward aperture 24*a* to enable the directing of a tool and the like of the conical insert 24 to enhance cleaning thereof.

It should be understood that the ceramic plate 18 is formed of a greater density than that defined by the organization 11 and the like that is typically formed of a cellular material such as wood or polymeric material of a relatively rigid structure. The enhanced density of the ceramic plate and its relatively smooth finished surface enhances the cleansing and maintenance of the plate during use.

As such, it may be appreciated that the above manner of usage and operation of the instant invention should be apparent from the aforenoted description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A glue gun holder apparatus for securement of a glue gun therein, wherein the gun includes a central body, with a handle extending generally orthogonally to the central body, and further including a trigger switch mounted within the handle, and a clip mounted forwardly of the trigger onto the central body, the apparatus comprising in combination, a support base including a top planar surface defined by a rear edge, a forward edge, a right side, and a left side, and a registration container mounted to the top surface adjacent the rear edge and right side, and a support wall mounted to the top surface oriented forwardly of the registration container for mounting the glue gun body thereon, and a plate positioned forwardly of the support wall to receive excessive glue deposited thereon, and a glue gun magazine container mounted integrally to the top surface adjacent the plate, and wherein the plate is defined by a planar ceramic plate of greater density that that defined by the support base to enhance cleaning and maintenance of the plate, and wherein the registration container includes four vertical walls mounted orthogonally relative to the base, each of the four walls includes a downwardly sloping interior surface directed interiorly of the container to receive the handle of the glue gun therein, and wherein each of the four walls is of a predetermined height, the support wall is defined by a further predetermined height greater than that defined by the predetermined height, and including a left leg mounted to a left side of the support wall, and a right leg mounted to a right side wall of the support wall, the left leg and right leg extending above the forward wall to receive the body of the glue gun therebetween, and wherein the support wall is of a generally "L" shaped configuration with an upper portion of the forward wall directed rearwardly and in alignment with the registration container, and the free terminal end of the support wall defined by an arcuate forward surface to contact the body of the glue gun in a non-marring or non-abrasive manner, and further including a clip mounting block integrally mounted to the top planar surface of the support base adjacent a forward surface of the support base, and rearwardly of a rear edge of the ceramic plate to receive the clip thereon, the block defined by a yet further predetermined height less than the predetermined height of the registration container, and further including a tip cleaning block mounted rearwardly of the magazine, and wherein the tip cleaning block includes a series of conical recesses formed therewithin for cleaning of a glue extrusion tip of the glue gun, and wherein each of the conical recess is defined by a ribbed interior conical surface.

2. An apparatus as set forth in claim 1 wherein each of the conical recesses is defined within a removable metallic insert, each metallic insert selectively removable from the tip cleaning block for cleaning and maintenance thereof.

* * * * *